May 7, 1957  A. POLIANSKY  2,791,214
APPARATUS FOR UTILIZATION OF SOLAR HEAT
Filed March 18, 1953  2 Sheets-Sheet 1
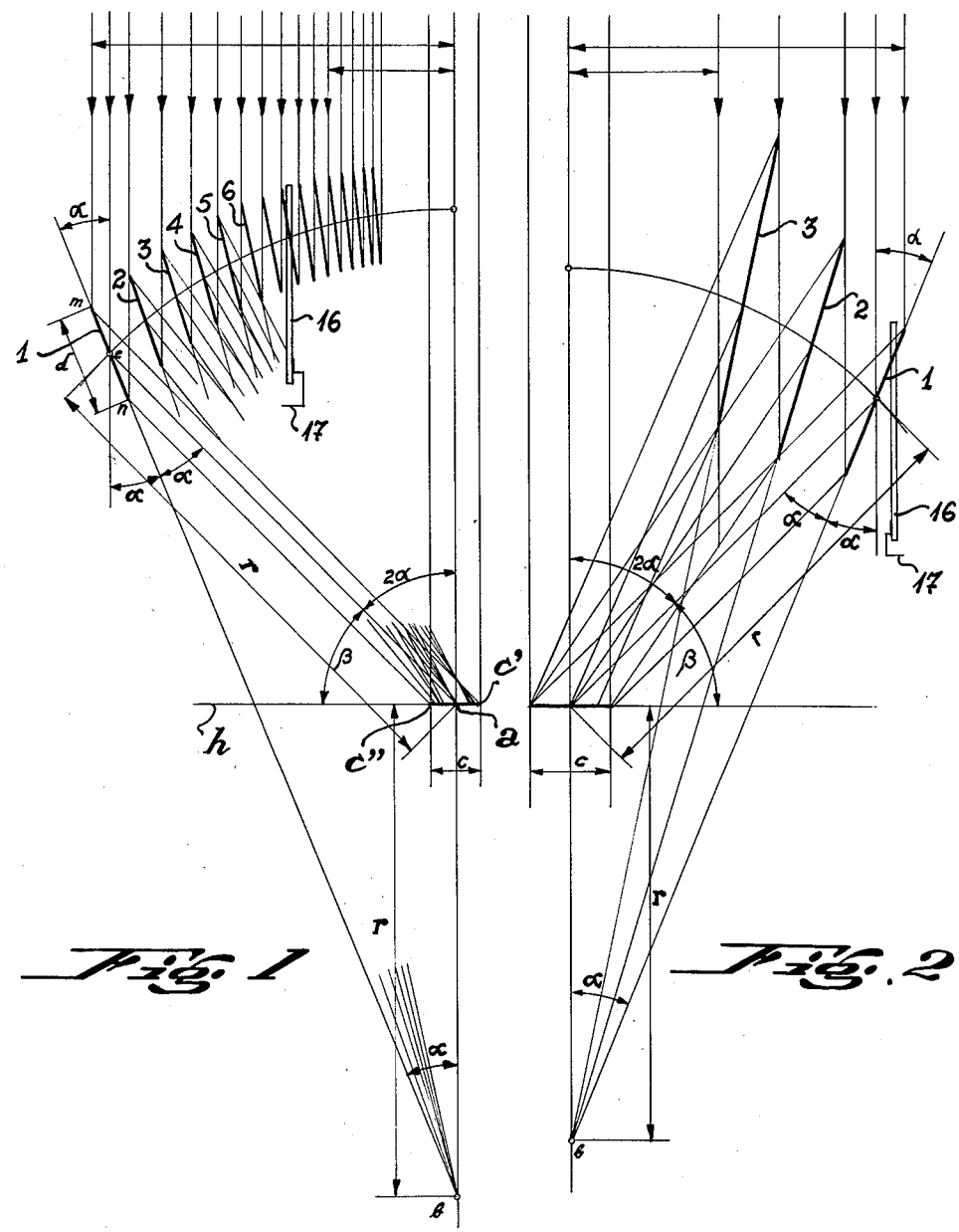
INVENTOR.
Alejandro Poliansky
BY
Harry Ernest Kubens
attorney

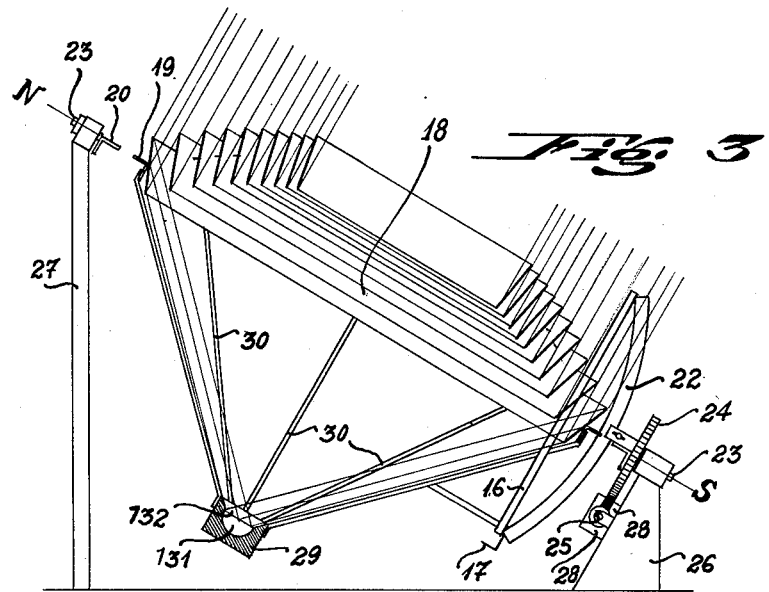
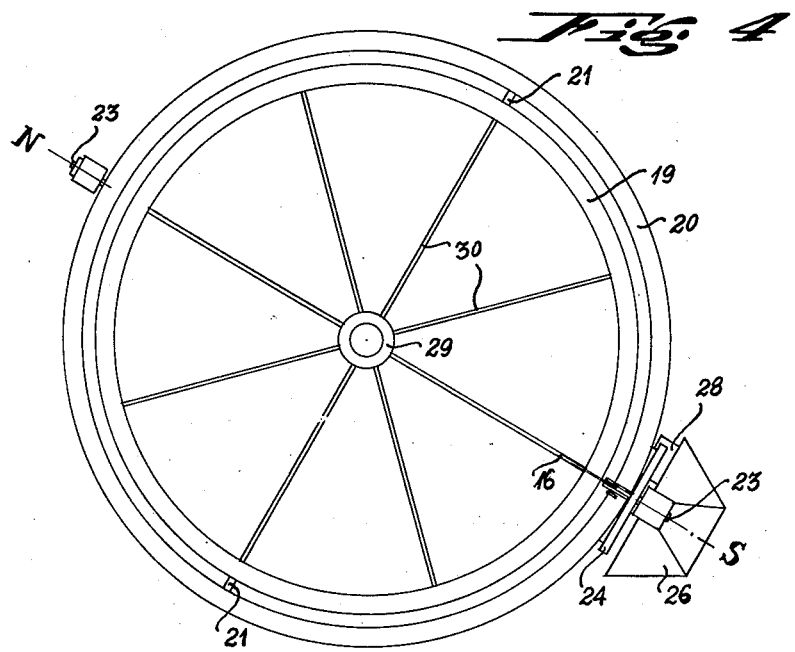

United States Patent Office 2,791,214
Patented May 7, 1957

2,791,214

APPARATUS FOR UTILIZATION OF SOLAR HEAT

Alejandro Poliansky, Buenos Aires, Argentina

Application March 18, 1953, Serial No. 343,014

2 Claims. (Cl. 126—270)

My present invention refers to certain new and useful improvements in apparatus for utilization of solar heat as disclosed in my co-pending application Serial No. 107,455 (now abandoned), of which this is a continuation-in-part application.

The main object of my invention is to provide an improved apparatus for utilization of solar heat comprising a movably arranged, reflector structure formed by a plurality of coaxial circular reflector bodies of sheet material having reflecting surfaces developed by straight line generators, said reflector bodies being arranged at successively increasing distances from and at successively increasing angles to a line passing through the focus of the sun rays reflected by said surfaces and through the point of convergence of said generators and coinciding with the common axis of said reflector bodies, said focus and said point of convergence being always situated below said reflector structure and the distance between said point of convergence and said focus being equal the distance between said focus and the centre line of all said reflecting surfaces, and the outer edge of each reflector body being arranged in alignment with the inner edge of the adjacent outer reflector body in a direction parallel to the axis of these reflector bodies; a movable furnace arranged in said focus and rigidly connected by diverging rod members to said reflector structure for consuming the heat concentrated by said reflector bodies; rod and ring means for assembling these reflector bodies to form a structural reflector unit, which by means of said diverging rods forms a rigid structural unit with said furnace; stationary shaft means for rotatively mounting the structural reflector and furnace unit, said shaft means constituting the north-south axis of the apparatus support means for rotatively mounting said shaft means with said north-south axis in a direction parallel to the axis of the earth and with an inclination equal the latitude of the place where the apparatus is installed; driving means connected to said shaft means for rotating the reflector and furnace unit and changing its position in accordance with the daily movement of the earth with respect to the sun; pivot means in said rotatively mounted unit for the adjustment of the reflector bodies around an axis transverse to said north-south axis, and a curved member for fixing said reflector and furnace unit independently of its rotation around said north-south axis in an adjusted position for compensating for the seasonal inclination of the sun.

According to one important feature of the invention, the focus of the concentrated sun rays is situated at a point below the reflector structure with the advantageous result that the same does not substantially change its place when the position of the reflector structure is changed to follow the movement of the earth with regard to the sun and that in addition hereto the furnace arranged in said focus of concentration is readily accessible.

In accordance with another not less important feature of the invention, the reflector bodies of sheet material are so arranged that all the sun rays inciding upon the area defined by the outer reflector body or bodies are effectively concentrated upon a relatively small area of concentration with the advantageous result that no solar heat is lost.

According to an additional feature of the invention, the reflector bodies of sheet material composing the reflector structure may be made of different height with the advantageous result that the number of such reflector bodies may be reduced and that the concentrated solar heat is uniformly distributed over a larger area of concentration.

The improved apparatus for utilization of solar heat advantageously comprises a frame structure and a support structure and includes a tubular member arranged in direction parallel to the axis of the apparatus, so constructed and arranged that the periodical or continuous correction of the position of the reflector structure is rendered an easy operation.

With these objects and advantageous features in view, the present invention comprises the arrangement, combination and construction of parts as will be hereinafter fully described with particular reference to the accompanying drawings, whereon several embodiments of the invention have been illustrated by way of examples only and whereon;

Figures 1 and 2 are fragmentary schematic views of the device for utilization of solar heat according to the invention, illustrating the manner of receiving and reflecting the sun rays by means of two slightly different reflector arrangements;

Figure 3 shows in elevation a preferred embodiment of the device for utilization of solar heat according to the invention;

Figure 4 is a plan view of the device according to Figure 3.

The device for utilization of solar heat forming the object matter of this invention is based upon a structure consisting of a number of reflector rings of different paraboloids of revolution related to each other in such a manner as to concentrate their respective focuses on an area $c$ (Figures 1 and 2). In view of that the construction of paraboloids is rather difficult, particularly if the same are of larger dimensions, I propose to employ reflector rings of truncated cone shape or reflector rings in the form of a polyhedrical truncated pyramid.

In order to fully understand the principle of construction of the device according to my invention, the following explanations may be useful:

For the construction of a device for utilization of solar heat to be used at a determined place, it is necessary to determine: the solar constant at said place, the diameter of the area of concentration $c$ of the solar heat to be utilized, the number of calories desired per surface unit of said area of concentration, and thereafter the outer diameter $2R$ of the device is calculated on the basis of the equation $$\pi R^2 = \frac{\pi c^2 q}{4p}$$

wherein $c$ is the diameter in centimeters of the area of concentration, $q$ is the number of calories desired per square centimeter, and $p$ is the solar constant.

After thus determining the outer diameter of the device, from the centre $a$ of the area $c$ (Figure 1) a perpendicular line is traced to establish the axis of the device. Then the angle $\beta$ under which the sun rays are to be reflected by the outer reflector ring of the device is selected and the line forming said angle $\beta$ with the horizontal $h$ traced from the centre $a$ of the area of concentration $c$, passes through the centre $e$ of a generatrix $m$—$n$ having a length $d$ which is in determined relation with the diameter of the area of concentration $c$ and with the angles $\beta$ and α. The distance r between the centres a and e is calculated on the basis of the following equation $$r = \frac{2R - d \sin \alpha}{2 \cos \beta}$$

wherein R is the radius of the device, d as aforesaid is the length of the generatrix m—n, and α is one half of the angle=90°—β. After thus determining the distance r, the perpendicular line passing through the centre a is prolongated downwards to the point b, the distance of which from the centre a is equal the distance r, and now the points b and e are interconnected. The connecting line b—e determines the inclination of the outer reflector ring m—n, the height of which d is determined by the two lines c'—m, c"—n parallel to the line a—e. In view of that the sun rays are received in a direction parallel to the axis of the device and are reflected under the angle of incidence, the sun rays received by the centre e of the reflector surface m—n will be directed to the centre a of the area of concentration c, as will be clearly understood from the details shown in Figure 1 particularly in as far as the angle α is concerned.

Tracing a circle around the centre a with the radius r, this circle indicates the centre points e of all the different concentric reflector rings 1, 2, 3 . . . 15, etc. The inclination of each reflector ring is determined by the lines connecting their centres e with the point b and the inclined reflector rings 1, 2 . . . 15, etc. receiving all the sun rays incident thereon will direct the same towards the area of concentration as clearly shown in Figure 1.

In order to entirely utilize the solar heat received by the reflector rings, according to one feature of the invention, these rings are arranged one with regard to the adjacent one in such a manner that the sun rays reflected by one ring are not intercepted by the adjacent ring. For this purpose, in the arrangement illustrated in Figure 1 the distance between the adjacent reflector rings 1, 2, 3, etc. decreases towards the axis of the device, whereas the height of the reflector rings remains unaltered.

A slightly modified arrangement of the reflector rings has been shown in Figure 2, wherein the rings 1, 2, 3, etc. are of different height with the result that the sun rays reflected thereby are uniformly distributed over the entire area of concentration c. In this case, of course, according to the diameter of the area of concentration, the intensity of the heat concentrated on a given point of said area will not be as high as in the case of the arrangement shown in Figure 1.

In order to facilitate the adjustment of the axis of the device to a position parallel to the direction of the incident sun rays, the device according to the invention is provided with a tubular member as indicated at 16. This tube is arranged in a direction parallel to the axis of the device and carries a small plate 17 disposed at certain small distance below the lower end of said tube. Conveniently this plate carries a circular mark (not shown) and the arrangement of this control means is such that when the sun rays falling into the tube 16 illuminate on the plate 17 a circular area concentrical with the circular mark thereon, the device for utilization of solar heat will be in its correct position with regard to the sun.

If the reflector rings 1, 2, 3, etc. consist of relatively thin sheet metal, the same are suitably provided on their lower surfaces with reinforcing ribs or the like (not shown).

In accordance with the principle of construction of the device as hereinbefore explained with reference to the Figures 1 and 2, a practical embodiment of the invention may be executed as shown in Figures 3 and 4.

The device according to Figures 3 and 4 comprises an assembly of reflector rings 18 conveniently constructed of aluminium sheets. The reflecting surfaces of these rings are suitably polished and preferably coated with a layer of copper, nickel-silver, chromium or the like in order to improve the reflecting capacity of the same.

The rings 18 are rigidly interconnected in any suitable known manner and are supported by a circular frame 19 which in turn is disposed concentrically within an outer circular frame 20 and is rotatively supported by the latter by means of diametrically opposite studs 21 (Figure 4) in such a manner that the ring assembly 18 may be adjusted with regard to the axis N—S (Figure 4) over an angle of 23°27' in accordance with the position of the sun during the period of one year at the place where the device is used. In order to fix the ring assembly at its respective position, the same is provided with a curved member 22 secured to the ring frame 19 and eventually by means of a suitable connection to one of the rods 30 and capable of being fixed by means of a wing nut or the like (not shown) to the outer ring frame 20. This outer ring frame 20 in turn is supported by means of short shafts 23 in suitable bearings carried by supports such as indicated at 26 and 27. For the rotation of the outer ring frame 20 around the short shafts 23 the same is provided with a toothed wheel or segment 24 fixedly secured to said ring frame and meshing with an endless screw 25 suitably mounted on the support 26. The endless screw 25 may be operated manually or mechanically by means of a small motor or a clock work indicated at 28 in accordance with the daily movement of the earth with regard to the sun.

In order to ensure an easy adjustment of the device with regard to the position of the sun, the studs 21 as well as the short shafts 23 are conveniently disposed on planes passing through the centers of gravity of the respective parts.

The adjustment of the reflector assembly in accordance with the respective position of the sun, of course, involves a slight displacement of the area of concentration which in the embodiment of Figures 3 and 4 is a small furnace or crucible indicated at 29 fixedly connected to the ring frame 19 by means of rods 30. The furnace is constructed in such a manner that by virtue of a semispherical member 131 the container 132 of the material to be heat-treated may always be placed in a horizontal position.

The operation of this heat collector is clearly understood from the explanations given with regard to Figure 1, so that it is not necessary to give a detailed description thereof.

It will be understood that the present invention is by no means restricted to the embodiments as hereinbefore described and as illustrated on the accompanying drawings, but that modifications and amendments may be made therein in as far as constructive details of the parts of the device are concerned as may fall within the scope of the appended claims.

What I claim as new and desire to secure by Letters Patent is:

1. In an apparatus for utilization of solar heat, movably arranged, a reflector structure comprising a plurality of coaxial circular reflector bodies of sheet material having reflecting surfaces developed by straight line generators, said reflector bodies being arranged at successively increasing distances from and at successively increasing angles to a line passing through the focus of the sun rays reflected by said surfaces and through the point of convergence of said generators and coinciding with the common axis of said reflector bodies, said focus and said point of convergence being always situated below said reflector structure and the distance between said point of convergence and said focus being equal the distance between said focus and the centre line of all said reflecting surfaces, and the outer edge of each reflector body being arranged in alignment with the inner edge of the adjacent outer reflector body in a direction parallel to the axis of these reflector bodies; a movable furnace arranged in said focus and rigidly connected by diverging rod members to said reflector structure for consuming the heat concentrated by said reflector bodies; rod and ring means for assembling these reflector bodies to form a structural reflector unit which by means of said diverging rods forms a rigid structural unit with said furnace; stationary shaft means for rotatively mounting the reflector unit, said shaft means constituting the north-south axis of the apparatus; support means for rotatively mounting said shaft means with said north-south axis in a direction parallel to the axis of the earth and with an inclination equal the latitude of the place where the apparatus is installed; driving means connected to said shaft means for rotating the reflector and furnace unit and changing its position in accordance with the daily movement of the earth with respect to the sun; pivot means in said rotatively mounted unit for the adjustment of the reflector bodies around an axis transverse to said north-south axis, and a curved member for fixing said reflector and furnace unit independently of its rotation around said north-south axis in an adjusted position for compensating for the seasonal inclination of the sun.

2. In an apparatus for utilization of solar heat, movably arranged, a reflector structure comprising a plurality of coaxial circular reflector bodies of sheet material having reflecting surfaces developed by straight line generators, said reflector bodies being arranged at successively increasing distances from and at successively increasing angles to a line passing through the focus of the sun rays reflected by said surfaces and through the point of convergence of said generators and coinciding with the common axis of said reflector bodies, said focus and said point of convergence being always situated below said reflector structure and the distance between said point of convergence and said focus being equal the distance between said focus and the centre line of all said reflecting surfaces, and the outer edge of each reflector body being arranged in alignment with the inner edge of the adjacent outer reflector body in a direction parallel to the axis of these reflector bodies; a movable furnace arranged in said focus and rigidly connected by diverging rod members to said reflector structure for consuming the heat concentrated by said reflector bodies; rod and ring means for assembling these reflector bodies to form a structural reflector unit which by means of said diverging rods forms a rigid structural unit with said furnace; a pair of diametrically opposite short shafts engaging an outer annular member of said means for rotatively mounting said structural reflector and furnace unit, said pair of opposite shafts constituting the north-south axis of the apparatus; a pair of support members of different height for rotatively mounting said short shafts with said north-south axis in a direction parallel to the axis of the earth and with an inclination equal the latitude of the place where the apparatus is installed; driving means connected to one of said short shafts for rotating the structural reflector and furnace unit and changing its position in accordance with the daily movement of the earth with respect to the sun; a pair of diametrically opposite studs between said outer annular member and a concentric inner annular member of said ring means for the adjustment of said reflector bodies around an axis transverse to said north-south axis, and a curved member for fixing said reflector and furnace unit independently of its rotation in an adjusted position for compensating for the seasonal inclination of the sun.

References Cited in the file of this patent

UNITED STATES PATENTS

| 277,884 | Clark | May 22, 1883 |
| 787,145 | Brown | Apr. 11, 1905 |
| 1,421,506 | Limpert | July 4, 1922 |
| 1,479,923 | Moreau | Jan. 8, 1924 |
| 1,683,266 | Shipman | Sept. 4, 1928 |
| 1,951,404 | Goddard | Mar. 20, 1934 |